(12) United States Patent
Stewart et al.

(10) Patent No.: US 7,587,350 B1
(45) Date of Patent: Sep. 8, 2009

(54) INTEGRATED INVESTMENT MANAGEMENT SYSTEM WITH NETWORK DATAFEED

(75) Inventors: Robert S. Stewart, Pittsburgh, PA (US); Roland E. Collins, III, Ardmore, PA (US)

(73) Assignee: InvestEdge, Inc., Pittsburgh, PA (US)

(*) Notice: Subject to any disclaimer, the term of this patent is extended or adjusted under 35 U.S.C. 154(b) by 983 days.

(21) Appl. No.: 09/915,993

(22) Filed: Jul. 26, 2001

Related U.S. Application Data

(60) Provisional application No. 60/221,463, filed on Jul. 26, 2000.

(51) Int. Cl.
*G06Q 40/00* (2006.01)
(52) U.S. Cl. .................. 705/36 R; 705/35; 705/10; 705/30; 707/202; 707/3
(58) Field of Classification Search .............. 705/36 R
See application file for complete search history.

(56) References Cited

U.S. PATENT DOCUMENTS

| | | | | |
|---|---|---|---|---|
| 5,126,936 | A | * | 6/1992 | Champion et al. ........ 705/36 R |
| 6,021,397 | A | * | 2/2000 | Jones et al. ............. 705/36 R |
| 6,564,191 | B1 | * | 5/2003 | Reddy .................. 705/36 R |

OTHER PUBLICATIONS

Sarmiento, Anthony; Proquest, The CPA Journal, Sep. 1999, vol. 69, Iss 9 p. 40, 7 pages (10 pages attached).*
Mueller, Karin Price; "online, money management" ISBN: 0-7356-1111-4, 2001.*
"Helping you manage your client's futures and secure your own," printed from http://www.centerpiece.com/main.html on Sep. 14, 2002.
"A Partner in Your Success," printed from http://www.centerpiece.com/cpdscrp.html on Sep. 14, 2002.
"Advent Office Axys," printed from http://www.advent.com/products/axys/index.asp on Sep. 14, 2002.
"Advent Office Qube," printed from http://www.advent.com/products/qube/index.asp on Sep. 14, 2002.
"Advent Software," printed from http://www.advent.com on Sep. 14, 2002.
"Advent Office," printed from http://www.advent.com/products/index/asp on Sep. 14, 2002.
"FMC Financial Models," printed from http://www.fmco.com/default.asp on Sep. 14, 2002.
"FMC Products," printed from http://www.fmco.com/products.asp on Sep. 14, 2002.
"FMC Pacer," printed from http://www.fmco.com/products/pacer_1.asp on Sep. 14, 2002.

* cited by examiner

*Primary Examiner*—Kirsten S Apple
(74) *Attorney, Agent, or Firm*—K&L Gates LLP

(57) ABSTRACT

An investment management system in communication with a data vendor and an accounting system. The system includes an application server, the application server has logic configured to perform at least one of the following upon a user request:

portfolio analysis of an investment portfolio;
portfolio monitoring of the investment portfolio;
trade calculation and rebalancing;
scenario analysis;
reporting at least one holding of the investment portfolio; and
linking at least one publication to at least one holding of the investment portfolio.

The system also includes a database server in communication with the application server.

34 Claims, 14 Drawing Sheets

USER/CUSTOMER DATABASE 1000

| USER ID # 1020 | USER ACCESS CODE 1025 | USER PASSWORD 1030 | USER NAME 1035 | ACCOUNTS ALLOWED 1040 |
|---|---|---|---|---|
| 00001 | JSMITH | 1234 | JOHN SMITH | 1234567 |
| 00002 | AJONES | 2345 | ALICE JONES | 7654321 9876543 |
| 00003 | BHOOVIS | 3456 | BURT HOOVIS | 8765432 6543210 |

1005, 1010, 1015

| E-MAIL ADDRESS 1045 | ACCESS ALLOWED 1050 | USER TYPE 1055 | INVESTMENT RISK PROFILE 1060 |
|---|---|---|---|
| JSMITH@ DOMAIN.COM | INQUIRY ONLY | CUSTOMER | AGGRESSIVE |
| ALICE@ DOMAIN.COM | SYSTEM ADMIN | BROKER | --- |
| BHOOVIS@ DOMAIN.UK | INQUIRY & TRADING | CUSTOMER | CONSERVATIVE |

| ADDRESS 1065 | RELATED TO OTHER CUSTOMER 1070 | RELATIONSHIP TO OTHER CUSTOMER 1075 | PREFERRED LANGUAGE 1080 |
|---|---|---|---|
| 101 WATER ST SPRINGFIELD, OH | --- | --- | ENGLISH-US |
| 201 MAIN ST SEATTLE, WA | --- | --- | ENGLISH-US |
| 99 DOWNING ST LONDON, UK | 00001 | ADVISOR | ENGLISH-UK |

FIG. 6

ACCOUNT DATABASE 1100

| ACCOUNT ID # 1130 | ACCOUNT NUMBER 1135 | ACCOUNT SOURCE 1140 | FULL ACCOUNT TITLE 1145 |
|---|---|---|---|
| 00001 | 1234567 | ADVISOR 1 | JOHN Q. SMITH |
| 00002 | 7654321 | BROKER A | ALICE JONES |
| 00003 | 9876543 | BROKER B | ALICE JONES & PAUL JONES |
| 00003 | 8765432 | BROKER A | BURT HOOVIS |
| 00003 | ZZZZZZ1 | SYNTHETIC ACCOUNT | BURT HOOVIS - OUTSIDE ASSETS |

(rows labeled 1105, 1110, 1115, 1120, 1125)

| ACCOUNT TYPE 1150 | DATE OPENED 1155 | TARGET ALLOCATION 1160 | TAX ID NUMBER 1165 | REPORTING CURRENCY 1170 |
|---|---|---|---|---|
| CUSTODY | 02/15/1997 | 65%-35%-0% | 111-22-3333 | USD |
| TRUST UNDER AGREEMENT | 12/03/1991 | 50%-40%-10% | 222-33-4444 | USD |
| ADVISORY | 01/08/2000 | 100%-0%-0% 8765432 | 333-44-5555 | USD |
| CUSTODY | 01/28/1995 | 100%-0%-0% | 444-55-6666 | GBP |
| NON-HELD | 07/15/2000 | 100%-0%-0% | 555-66-7777 | GBP |

FIG. 7

HOLDINGS DATABASE 1200

| | POSITION ID # 1230 | CUSIP NUMBER 1235 | ACCOUNT NUMBER 1240 | SHARES/UNITS/ PAR VALUE 1245 |
|---|---|---|---|---|
| 1205 | 00001 | 123456789 | 1234567 | 25000.000 |
| 1210 | 00002 | 234567890 | 1234567 | 1378.450 |
| 1215 | 00003 | 123456789 | 7654321 | 250.000 |
| 1220 | 00003 | 345678AH9 | 7654321 | 100000.000 |
| 1225 | 00003 | 123456789 | ZZZZZZ1 | 15000.000 |

| MARKET VALUE 1250 | TAX COST 1255 | WHAT-IF TRADES 1260 | POSITION RESTRICTION 1262 | BASE CURRENCY 1265 |
|---|---|---|---|---|
| 3218750.00 | 2500000.00 | -5000 | --- | USD |
| 27396.69 | 19876.34 | --- | --- | USD |
| 32187.50 | 35875.25 | --- | --- | USD |
| 101250.00 | 100000.00 | --- | --- | USD |
| 1931250.00 | 30000.00 | --- | 15000 | USD |

FIG. 8

COMPANY/SECURITY DATABASE 1300

| SECURITY ID # 1320 | CUSIP NIUMBER 1325 | TICKER SYMBOL 1330 | SECURITY NAME 1335 |
|---|---|---|---|
| 00001 | 123456789 | XYZ | XYZ SOFTWARE |
| 00002 | 234567890 | ABCD | ABC GROWTH FUND |
| 00003 | 345678AH9 | ---- | PIMA COUNTY AZ BOND 5.50% DUE 2/20/2009 |

1305 — row 00001
1310 — row 00002
1315 — row 00003

| SECURITY TYPE 1340 | LAST PRICE 1345 | STOCK SECTOR 1350 | STOCK BETA 1355 | MARKET CAPITALIZATION 1360 |
|---|---|---|---|---|
| STOCK | 128.75 | TECH-NOLOGY | 1.18 | 1,507,893,276 |
| FUND | 19.875 | --- | .97 | 14,935,197,237 |
| BOND | 101.25 | --- | --- | ---- |

| YIELD % 1365 | PRICE/ EARNINGS RATIO 1370 | BOND TYPE 1375 | BOND DURATION 1380 | COUNTRY OF ISSUE 1385 |
|---|---|---|---|---|
| 0 | 59.1 | --- | --- | USD |
| 2.2 | 21.6 | --- | --- | USD |
| 5.03 | --- | MUNICIPAL | 5.63 | USD |

FIG. 9

PUBLICATION DATABASE 1400

| | PUBLICATION ID # 1430 | PUBLICATION SECTION 1435 | TITLE 1440 | KEYWORDS 1445 |
|---|---|---|---|---|
| 1405 | 00001 | COMPANY RESEARCH | EARNINGS ANNOUNCEMENT | MACROSOFT EXCEEDED |
| 1410 | 00002 | PRODUCTS | MODEL PORTFOLIO PERFORMANCE | JUNE 2Q |
| 1415 | 00003 | STRATEGY | ECONOMIC OUTLOOK | INTEREST RATES GDP |
| 1420 | 00003 | COMPANY RESEARCH | COMPANY DOWNGRADE | GLOBALWEB BELOW TARGET |
| 1425 | 00003 | COMPANY RESEARCH | ANNUAL REVIEW | MACROSOFT SOFTWARE |

| TICKER 1450 | AS OF DATE 1455 | PUBLICATION CYCLE 1460 | INQUIRY ACCESS 1465 | LANGUAGE 1470 | FILE LOCATION 1475 |
|---|---|---|---|---|---|
| XYZ | 05/25/2000 | QUARTERLY | BROKERS | ENGLISH-US | \REPORTS\XZY.PDF |
| ---- | 07/03/2000 | QUARTERLY | BROKERS | ENGLISH-US | \MODEL\JUNE.PDF |
| ---- | 07/08/2000 | MONTHLY | ALL USERS | ENGLISH-US | \ECON\JULY.HTML |
| ABCD | 01/15/2000 | --- | BROKERS | ENGLISH-US | \ALERT\ABCD.PDF |
| XYZ | 02/23/2000 | ANNUALLY | ALL USERS | ENGLISH-US | \ANNUAL\XYZ.PDF |

FIG. 10

INTEGRATED INVESTMENT MANAGEMENT SYSTEM WITH NETWORK DATAFEED

CROSS REFERENCE TO RELATED APPLICATIONS

This application claims priority under 35 U.S.C. § 119(e) to U.S. provisional patent application No. 60/221,463, filed Jul. 26, 2000.

BACKGROUND OF THE INVENTION

Investment firms and independent advisors select investments for their customers' portfolios and implement those selections via security trading. The investment professionals rely on accounting systems, also referred to as books-of-record systems, to track the positions in customers' portfolios. In situations where the investment professional does not have custody of the portfolios that are being advised or where the books-of-record system does not have portfolio management functions, a separate portfolio accounting system is used to duplicate the books-of-record system positions. This duplication of effort often involves reconciliation and adjustments as the two accounting systems are seldom in perfect synchronization.

Investment professionals may also use separate systems for portfolio reporting, trade calculation and rebalancing, reporting, document management and customer relationship management. These systems are typically distinct and separate from one another and do not share data or a common user interface.

Investment professionals and their customers are increasingly becoming connected via public networks such as the Internet and are also becoming more dispersed from central office locations. In some cases, data and reports from the books-of-record systems or portfolio accounting systems are loaded onto a website accessible from the Internet but the functions available are a small subset of the functions of the portfolio accounting system.

As apparent from the above deficiencies with conventional systems for managing investment portfolios, a need exists for a system that leverages the books-of-record system data without duplicating accounting functions. A further need exists for an integrated system that permits investment professionals to access multiple functions through a common system that integrates the functions that include: portfolio analysis, monitoring, portfolio rebalancing and trade calculation, scenario analysis, reporting and linking publications and data to portfolio holdings. Yet another need exists for a system that permits investment professionals and their customers to access all of these integrated components via a public network such as the Internet.

SUMMARY OF THE INVENTION

The present invention discloses an investment management system in communication with a data vendor and an accounting system. The system includes an application server, the application server has logic configured to perform at least one of the following upon a user request:
  portfolio analysis of an investment portfolio;
  portfolio monitoring of the investment portfolio;
  trade calculation and rebalancing;
  scenario analysis;
  reporting at least one holding of the investment portfolio; and
  linking at least one publication to at least one holding of the investment portfolio.

The system also includes a database server in communication with the application server.

BRIEF DESCRIPTION OF THE DRAWINGS

For the present invention to be clearly understood and readily practiced, the present invention will be described in conjunction with the following figures, wherein:

FIG. 6 illustrates a sample user/customer database from the IMS database server in FIG. 3;

FIG. 7 illustrates a sample account database from the IMS database server in FIG. 3;

FIG. 8 illustrates a sample holdings database from the IMS database server in FIG. 3;

FIG. 9 illustrates a sample company/security database from the IMS database server in FIG. 3;

FIG. 10 illustrates a sample publications database from the IMS database server in FIG. 3;

DETAILED DESCRIPTION OF THE PREFERRED EMBODIMENTS

Figure 1:
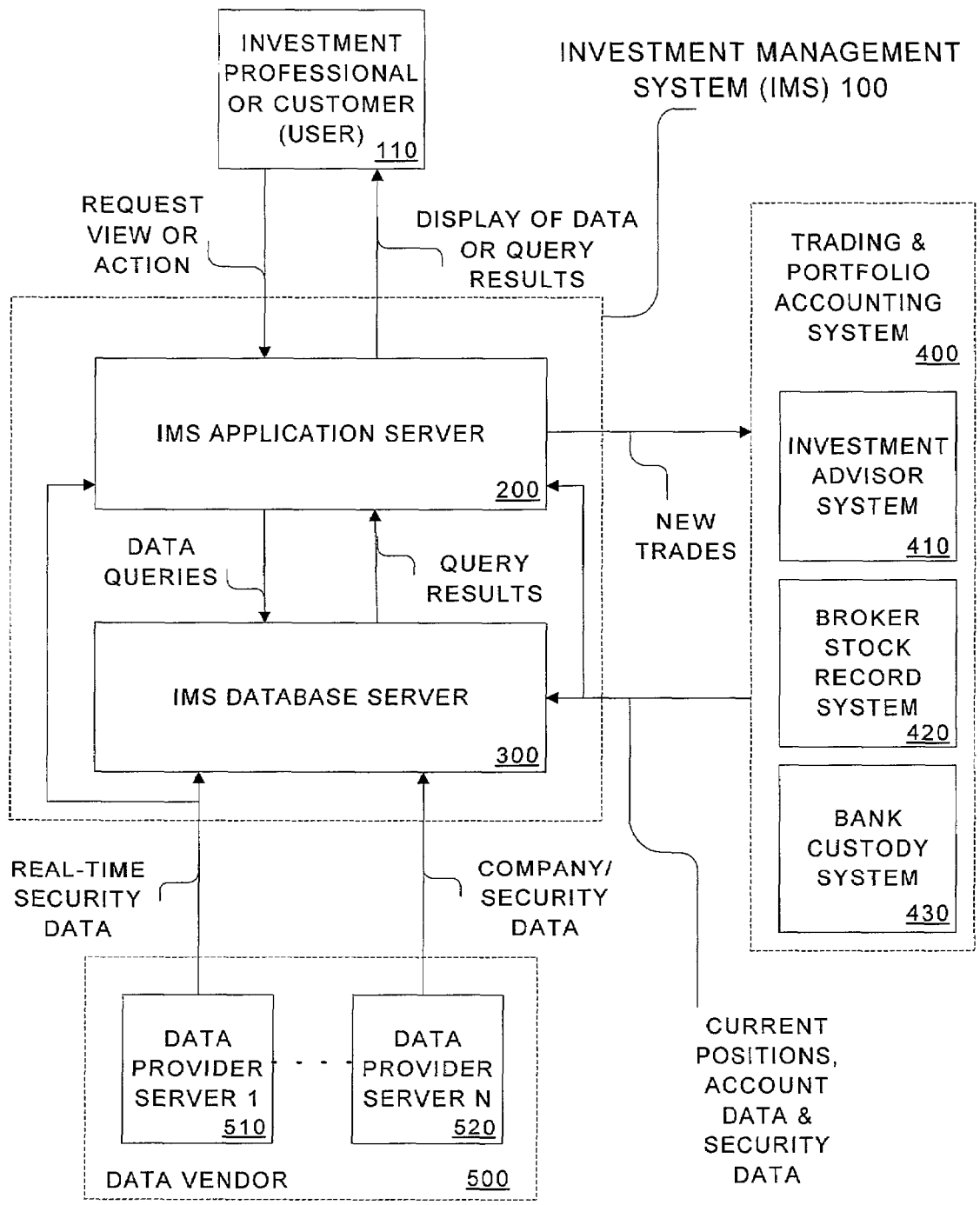
FIG. 1 is a schematic block diagram illustrating an integrated investment management system (IMS) in accordance with one embodiment of the present invention.

With reference to FIG. 1, an integrated investment management system (IMS) 100 delivers integrated data, information and calculated results to an investment professional or customer, hereinafter referred to as user 110. This information is retrieved from an IMS application server 200 and an IMS database server 300 according to the instructions input by user 110.

User 110 accesses this information through an electronic device connected to a network that is also connected to an IMS 100. The user 110 may access IMS 100 with, for example, a web browser or other device over the Internet using a public switched telephone network (PSTN), private network, or other network using communications links between nodes, such as a cable, fiber or wireless link on which electronic signals can propagate. Alternatively, user 110 can access IMS 100 over, for example, private local area networks, wide area networks, or through telephone voice response systems.

Figure 11:
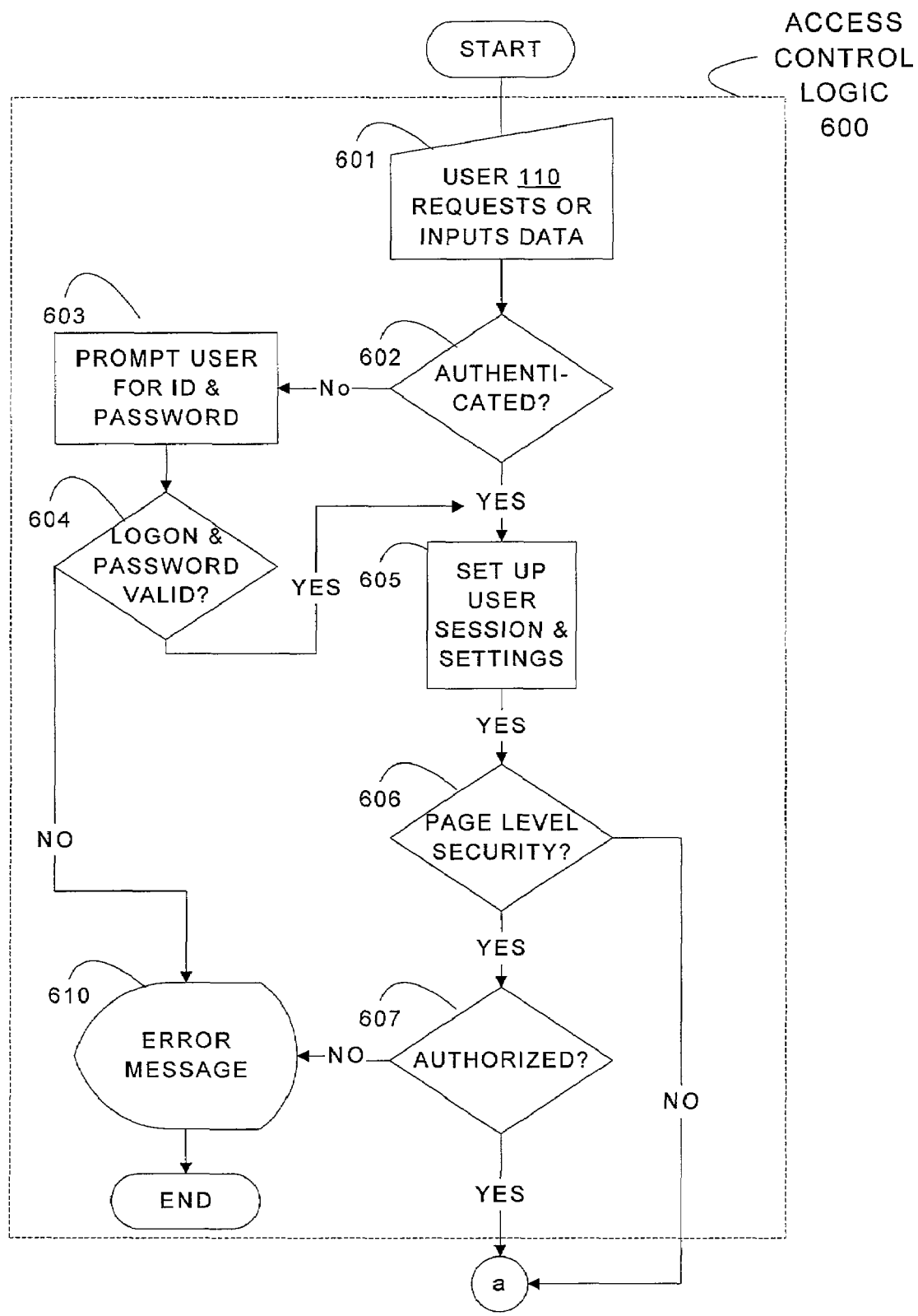
FIG. 11 is a flow chart diagram illustrating an embodiment of the access control logic from the IMS application server in FIG. 2.

The identity of user 110 may be established as described herein in conjunction with FIG. 11. User 110 accesses IMS 100 to retrieve data, charts, reports, calculations, and other information regarding one or more investment accounts or portfolios previously authorized for user 110. Portfolios and related statistics may be viewed singly or in combination with other actual or fictitious portfolios. Additionally, user 110 can view statistics, reports, comments, and other information relating to one or more portfolios or securities.

FIG. 1 also represents the flow of electronic data whereby IMS application server 200 receives instructions from user 110, processes the request, and relays data queries to IMS database server 300 for retrieval. When the query results are received from IMS database server 300, IMS application server 200 performs calculations and formats the output that is delivered to user 110.

When the instructions include the calculation of new security trades, IMS application server 200 transmits the trade details over, for example, the public or private networks described previously to a trading and portfolio accounting system 400. In addition, IMS application server 200 performs scheduled functions and calculations for which the results may be communicated to user 110 using electronic mail over networks previously described or may be stored in IMS database server 300 for later retrieval.

The data and information in IMS database 300 are loaded from trading and portfolio system 400 and a data vendor 500. Additionally, data can be input by user 110 into the IMS database server 300 through electronic screens accessed through IMS application server 200. The process of loading data from trading and portfolio accounting system 400 is described herein in conjunction with FIG. 14. Alternatively, an IMS application server 200 can access data directly from data vendor 500 and trading and portfolio accounting system 400, particularly when real-time data are needed or the data are used infrequently and are not stored on IMS database server 300.

As used herein, integrated data, information and calculated results are formed from, for example, a combination of data and processes that access multiple types of data from multiple sources combined with the use of consistent identifiers for securities (CUSIP, ticker symbol, or internal number); customers (tax identification number, user access code, electronic mail address, telephone number or internal number); and customer accounts (tax identification number or internal number). For example, user 110 can access investment research linked to holdings in an investment portfolio and also view details about the owner of the portfolio including asset allocation preferences to monitor the portfolio and also use IMS 100 to calculate trades.

Investment Management System

In one embodiment of the present invention, functions of each server may be distributed over more than one processor or server device using, for example, clustering, load balancing, replication, distributed processing, or message queuing techniques supported by the operating system. In another embodiment, IMS application server 200 and IMS database server 300 may be located at separate physical locations for, for example, security and availability. In either embodiment, data communications between servers can be maintained through public or private networks.

IMS application server 200 stores, for example, business rules, logic, and calculations that can be applied to holdings in one or more portfolios and individual or multiple investment securities. For example, user 110 can request a consolidated summary of multiple portfolios categorized by the type of security. IMS application server 200 receives the request, passes the data query to IMS database server 300, and receives the results of the query. Calculations are performed to first aggregate the holdings from each portfolio and then aggregate those holdings by security type. The results of the calculations are formatted and returned to user 110 for display.

Figure 3:
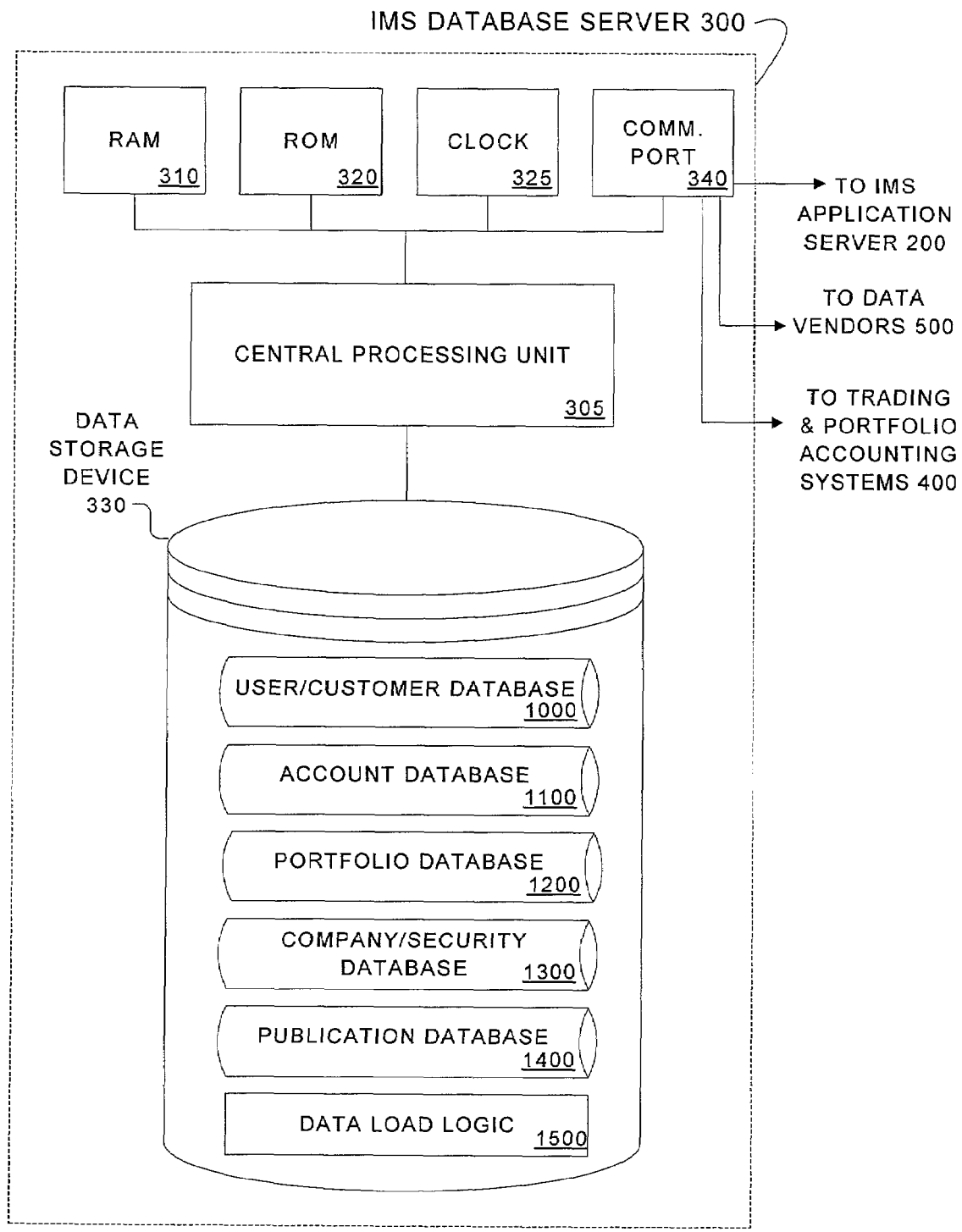
FIG. 3 is a schematic block diagram of the exemplary IMS database server of FIG. 1.

Data are extracted from trading and portfolio management system 400, including one or more investment advisor systems 410, broker stock record system 420, or bank custody system 430, where the owners of the data have created standing or dynamic instructions to periodically retrieve portfolio data from those systems and transmit the data files to IMS database server 300. The data are validated for completeness and loaded into account database 1100, portfolio (or holdings) database 1200 and company/security database 1300 in IMS database server 300 as illustrated in FIG. 3.

Data are also accessed from one or more data vendors 500 where the data are extracted from a number of data provider servers 510, 520 using standing or dynamic instructions to periodically retrieve, for example, company/security data, investment research, security prices, charts and graphics, and other data and information, and transmit those files to IMS database server 300. The data are validated for completeness and loaded into company/security database 1300 as illustrated in FIG. 3.

Figure 2:
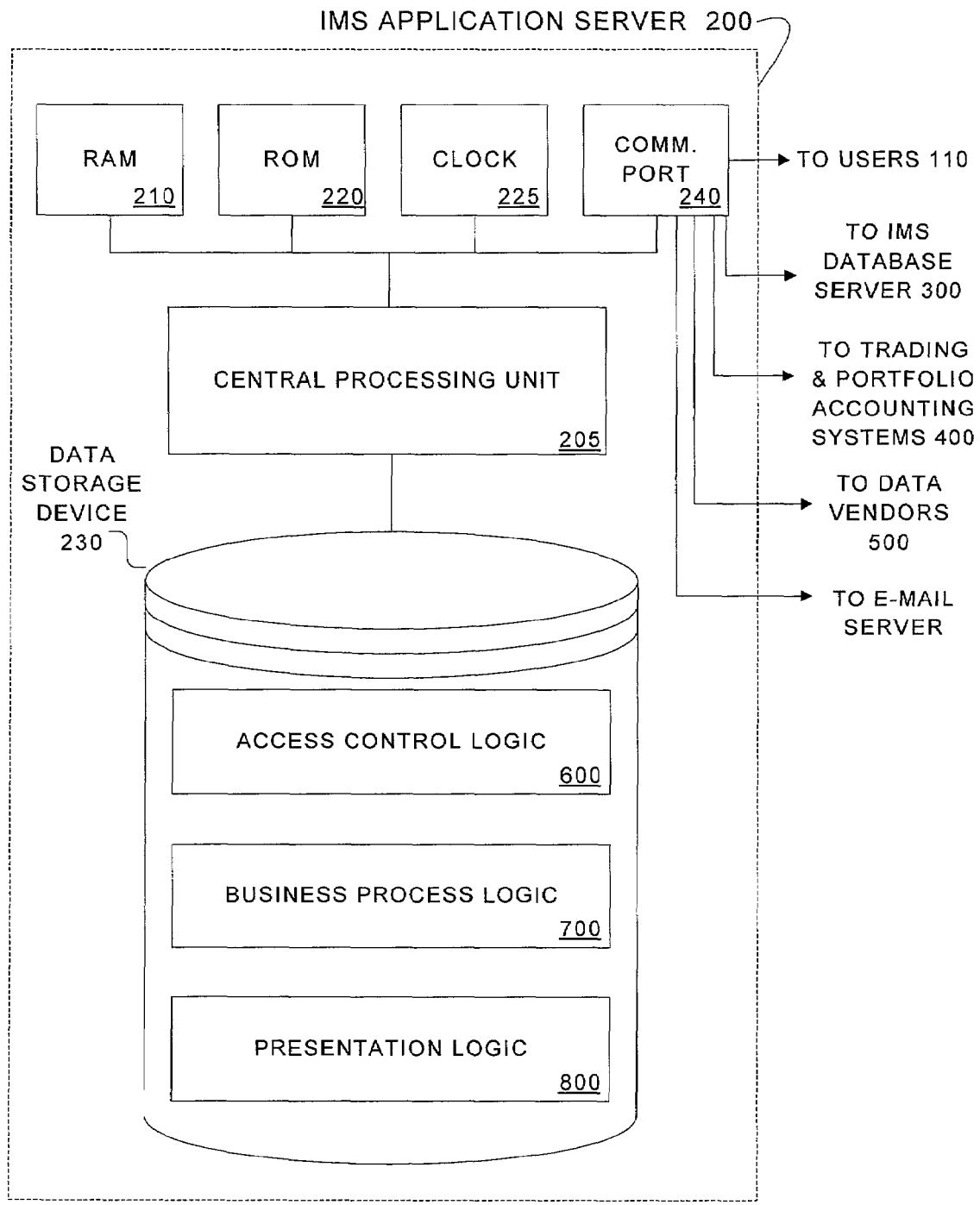
FIG. 2 is a schematic block diagram of the exemplary IMS application server of FIG. 1.

FIG. 2 is a block diagram showing the architecture of an exemplary IMS application server 200. IMS application server 200 includes certain standard hardware components, including a central processing unit (CPU) 205, random-access memory (RAM) 210, read-only memory (ROM) 220, a clock 225, a data storage device 230 and a communications port 240. The CPU 205 may be linked to each of the such elements, for example by a shared data bus or by dedicated connections.

CPU 205 may be embodied as a single commercially available processor, such as Intel's Pentium III microprocessor, Motorola G4 microprocessor, Sun Microsystems Ultrasparc microprocessor, or a similar microprocessor. Alternatively, CPU 205 may be embodied as a number of processors operating in parallel.

ROM 220 and/or data storage device 230 are operable to store one or more instructions which CPU 205 is operable to retrieve, interpret, and execute. For example, ROM 220 and/or data storage device 230 store instructions to perform the processing of input from user 110 and create numerous calculations and other operations to return a display to user 110.

Figure 12:
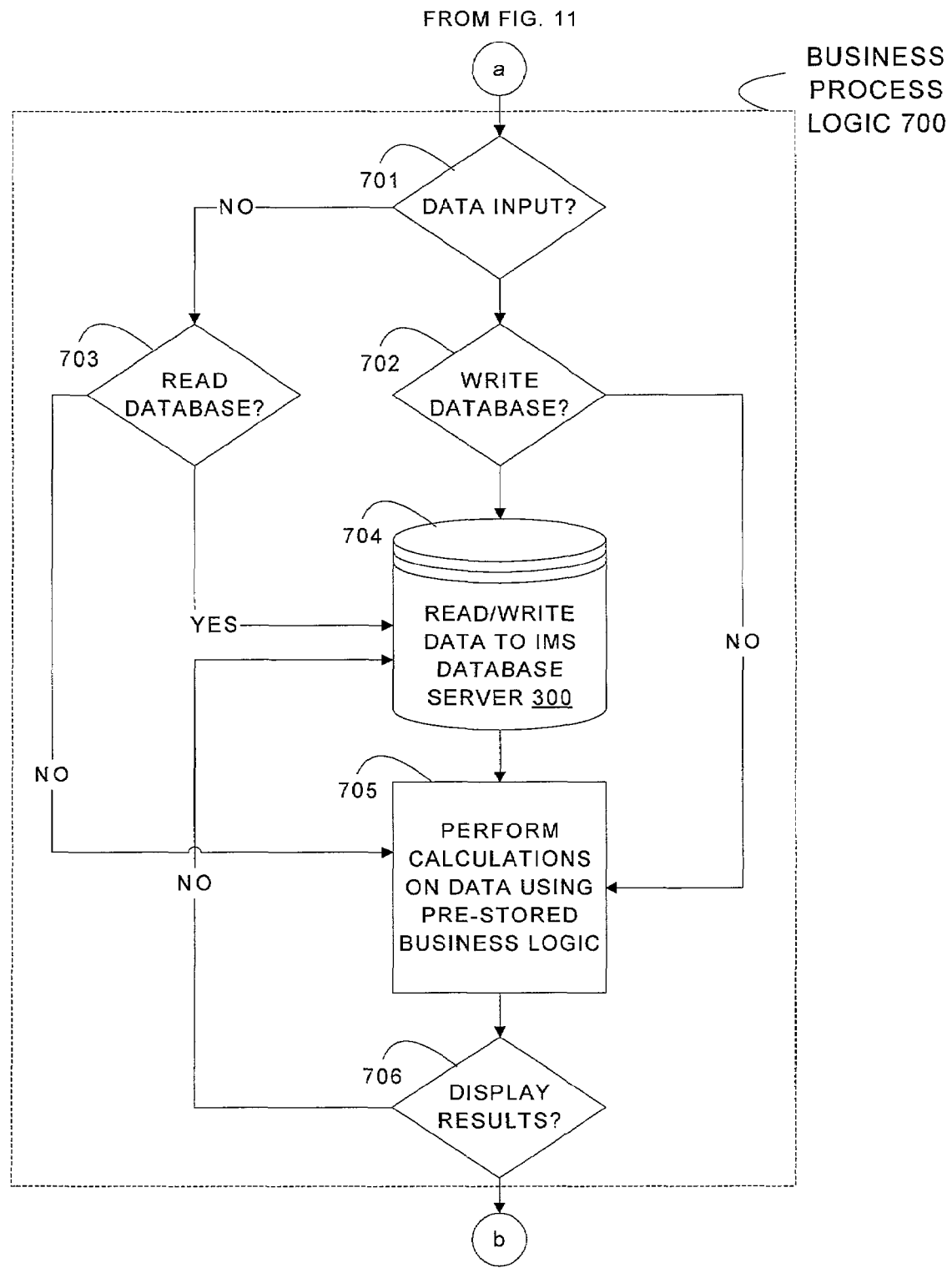
FIG. 12 is a flow chart diagram illustrating an embodiment of the business process logic from the IMS application server in FIG. 2.
Figure 13:
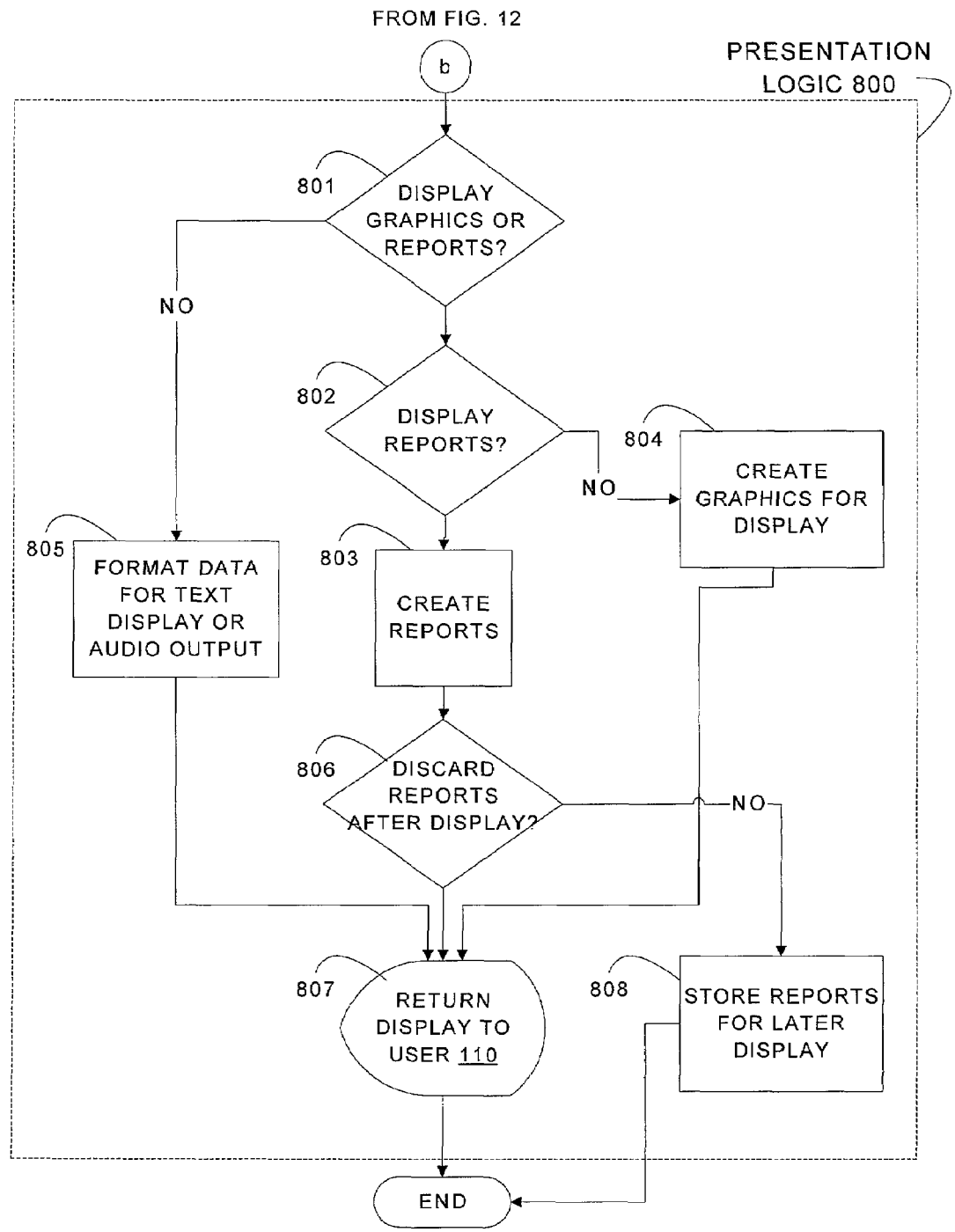
FIG. 13 is a flow chart diagram illustrating an embodiment of the presentation logic from the IMS application server in FIG. 2.

As discussed herein in conjunction with FIGS. 11-13, data storage device 230 includes access control logic 600, business process logic 700, and presentation logic 800 stored as computer programs or other instructions.

Communications port 240 connects the IMS application server 200 over, for example, a network to multiple sources including multiple users 110, IMS database server 300, trading and portfolio accounting system 400, data vendor 500, and external e-mail servers for delivery of messages created on IMS application server 200.

FIG. 3 is a block diagram showing the architecture of an exemplary IMS database server 300. IMS database server 300 includes certain standard hardware components, such as a central processing unit (CPU) 305, random-access memory (RAM) 310, read-only memory (ROM) 320, a clock 325, a data storage device 330, and a communications port 340. Communications port 340 connects IMS database server 300 to IMS application server 200, trading and portfolio accounting system 400 and data vendor 500.

As discussed herein in conjunction with FIGS. 6-10, data storage device 330 includes a user/customer database 1000, an account database 1100, a holdings database 1200, a company/security database 1300 and a publications database 1400. As previously indicated, data are manually input by multiple users 110 and/or periodically loaded from one or more trading and portfolio systems 400 and/or one or more data vendors 500 using data load logic 1500 to acquire, validate and index the data.

Trading and Portfolio Accounting Systems

Figure 4:
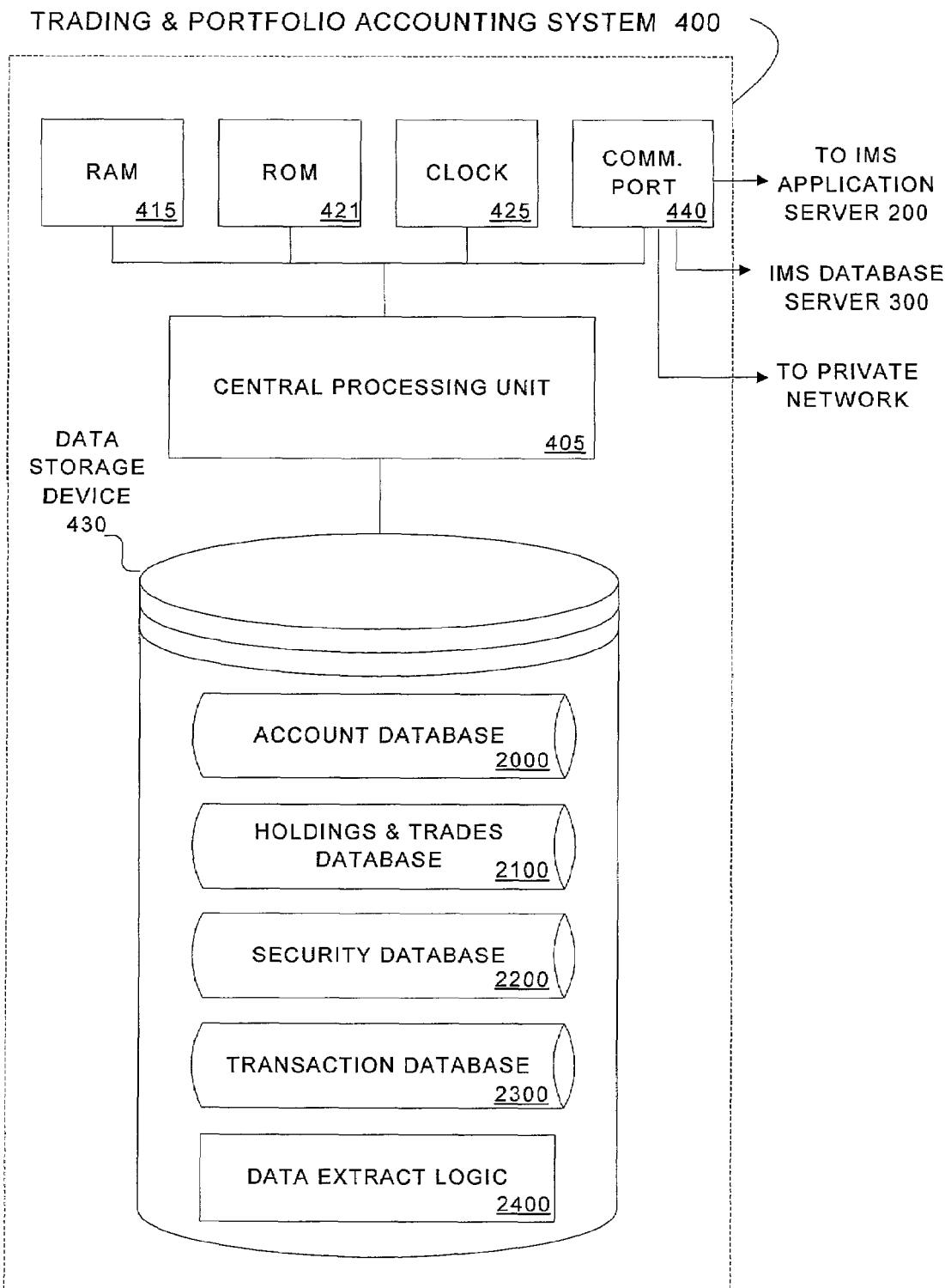
FIG. 4 is a schematic block diagram of the illustrative trading and portfolio management system of FIG. 1.

With reference to FIG. 4, and with continuing reference to FIG. 1, trading and portfolio accounting system 400 includes certain standard hardware components, such as a central processing unit (CPU) 405, random-access memory (RAM) 415, read-only memory (ROM) 421, a system clock 425, a data storage device 430 and a communications port 440. Communications port 440 connects the trading and portfolio accounting system 400 to an IMS database server 300, an IMS application server 200 and to a private network.

Data storage device 430 includes an account database 2000, a holdings and trades database 2100, a security database 2200, a transaction database 2300 and a data extract logic 2400. As discussed previously, the multiple owners of trading and portfolio accounting systems 400 utilize standing instructions in data extract logic 2400 to create data files that are transmitted over networks previously described for subsequent loading into IMS database server 300.

Data Vendors

Figure 5:
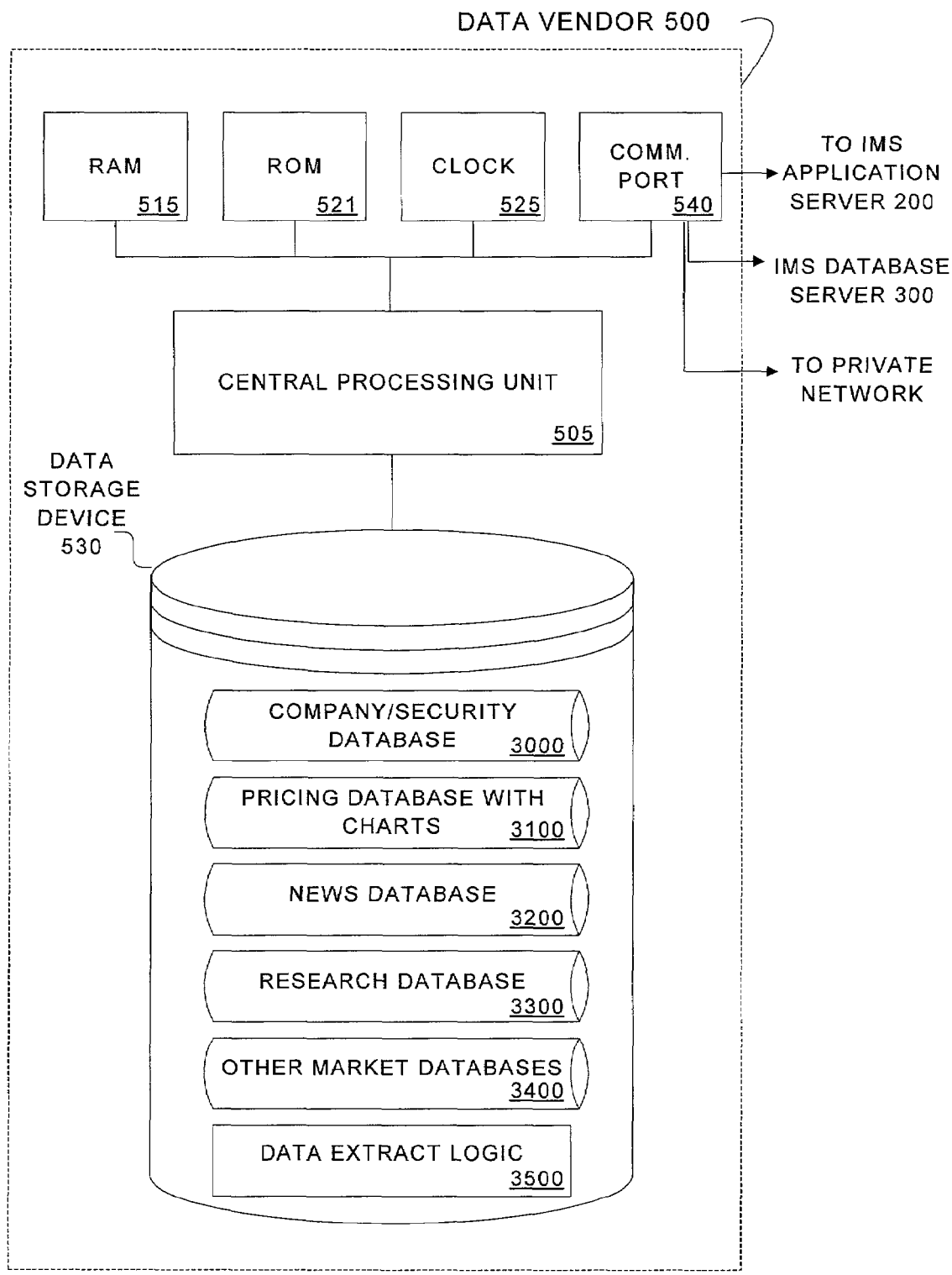
FIG. 5 is a schematic block diagram of the illustrative data provider server of FIG. 1.

With reference to FIG. 5, and with continuing reference to FIG. 1, data vendor system 500 includes certain standard hardware components, such as a central processing unit (CPU) 505, random-access memory (RAM) 515, read-only memory (ROM) 521, a system clock 525, a data storage device 530 and a communications port 540. Communications port 540 connects data vendor system 500 to an IMS database server 300, an IMS application server 200 and to other networks determined by the owners of the data vendor system 500.

Data storage device 530 may include a company/security database 3000, a pricing database with charts 3100, a news database 3200, a research database 3300, and one or more databases 3400 containing other market data including interest rate and economic information. In addition, data extract logic 3500 is used to create and transmit extracted files to IMS application server 200 and IMS database server 300.

Databases

With reference to FIG. 6, and with reference to FIG. 3, user/customer database 1000 stores information on each investment professional or customer designated as user 110 who accesses IMS 100. Customer database 1000 maintains a plurality of records, such as records 1005, 1010, 1015, each associated with a different user 110. A user ID 1020 stored in a field of each record may be utilized, for example, to index additional information about user 110, including, for example, access history, additional profiling data, and personal data.

A user access code field 1025 and a user password field 1030 of each record are used to authenticate a user 110 initially accessing an IMS 100. A user name field 1035 stores the name of the user 110. An accounts allowed field 1040 of each record stores the accounts, detailed in FIG. 7, that have been preauthorized for a user 110 to access. An e-mail address field 1045 stores the e-mail address of the user 110. An access allowed field 1050 of each record defines the types of functions that can be performed for each account. A user type field 1055 of each record displays the category for a user 110 that may be used for authorization or segmentation functions. An investment risk profile field 1060 of each record stores the investment risk profile that is input directly or derived from questions and calculations previously presented to a user. An address field 1065 stores the postal address of the user 110. Additionally, a related-to-other customer field 1070 of each record and a relationship to other customer field 1075 of each record store information that can link one user 110 with another to identify, for example, family and professional relationships. A preferred language field 1080 indicates the preferred language of the user 110.

With reference to FIG. 7, and with ongoing reference to FIG. 3, an exemplary account database 1100 stores information on each real record loaded into the system or each synthetic record that is input by a user 110. The account database 1100 maintains a plurality of records, such as records 1105, 1110, 1115, 1120, 1125, each associated with a different account. An account ID field 1130 of each record may be utilized, for example, to index additional information about an account including prior transactions, cash balances, and accounts to be consolidated.

An account number field 1135, a full account title field 1145, an account type field 1150, a date opened field 1155 and a tax ID field 1165 are loaded into each record of account database 1100 from one or more trading and portfolio accounting systems 400. An account source field 1140 of each record identifies the owner of a particular trading and portfolio accounting system 400 from which the account was loaded. A target allocation field 1160 of each record stores the target asset allocation and/or target account against which the current account will be compared for the purpose of monitoring or rebalancing the account. Each target allocation field 1160 lists each account asset by, for example, percentages of stocks, bonds and cash in the account. A reporting currency field 1170 of each record is the currency to be used when displaying or reporting the holdings of the portfolio, recalculating values when the base currency listed in a base currency field 1265 of the holdings database 1200 for a holding in an account does not match the reporting currency listed in the corresponding reporting currency field 1170 of the account.

With reference to FIG. 8, and with ongoing reference to FIG. 3, portfolio database 1200 stores information on each holding within an account. Portfolio database 1200 maintains a plurality of records, such as records 1205, 1210, 1215, 1220, 1225, each associated with an individual security within an individual account. A position ID field 1230 of each record may be utilized, for example, to index additional information about a holding including, for example, tax lots.

A committee for unique security identification procedure (CUSIP) number field 1235 of each record uniquely identifies each security that is contained in company/security database 1300. Alternatively, unique numbers may be assigned to identify cash or other securities that do not have an assigned CUSIP number. An account number field 1240 of each record identifies the account that owns the holding and a shares/units/par value field 1245 of each record contains the amount owned. A market value field 1250 of each record contains the most recent value of the holding and a tax cost field 1255 of each record shows the acquisition cost of the holding, both displayed in the base currency listed on the base currency field 1265 of each record. A what-if trades field 1260 of each record contains the amount of the holding that has been input or calculated for trading in a scenario analysis mode but has not yet been released to a trading system. A position restricted field 1262 of each record identifies the portion of the shares/ units/par value field 1245 of each record that is restricted from sale, due to customer preferences, covered option requirements, or margin requirements.

With reference to FIG. 9, and with ongoing reference to FIG. 3, company/security database 1300 stores information on each investment security. Company/security database 1300 maintains a plurality of records, such as records 1305, 1310, 1315, each associated with an individual security. A security ID field 1320 of each record may be utilized, for example, to index additional information about a security, including, for example, the detailed type of the security and its underlying characteristics.

A CUSIP number field 1325 of each record and ticker symbol field 1330 of each record uniquely identifies each security company/security database 1300 and may be utilized, for example, to index additional information about a security, including investment research reports, company fundamental data, corporate actions, prices and pricing charts. A security name field 1335 stores the name of the security. A security type field 1340 of each record is used to calculate asset allocation and other displays, and is also used to determine the types of additional data that may be linked or calculated for a particular security. Fields 1345, 1350, 1355, 1360, 1365, 1370, 1375, 1380 of each record store additional descriptive data for each security. A country-of-issue field 1385 of each record identifies the country where the company that issued the security is domiciled and is used for currency and tax calculations.

With reference to FIG. 10, and with ongoing reference to FIG. 3, publication database 1400 stores information on each document or publication stored in an IMS 100. The publication database 1400 maintains a plurality of records, such as records 1405, 1410, 1415, 1420, 1425, each associated with an individual electronic document that had been previously stored on the system. A publication ID field 1430 of each record may be utilized, for example, to index additional information about a publication including its history.

A publication section field 1435 of each record controls the preassigned category or section in which the document is displayed to a user 110. A title field 1440 of each record is the name of the associated document that is displayed, a keywords field 1445 of each record contains additional words that a user 110 can use in searching for a publication and a ticker field 1450 allows a user 110 to search using ticker symbols. Publication cycle field 1460 of each record lists the frequency of update for the publication and in conjunction with as-of-date field 1455 of each record can be used to identify stale documents that missed an update cycle. An inquiry access field 1465 of each record controls the groups of users who can view the publication, linked to one or more user types shown in the user type field of each record of 1055 user/customer data 1000 shown in FIG. 6. A language field 1470 of each record indicates the language in which the document was written. A location field 1475 of each record indicates the file location on the server where the actual electronic document is stored and is used to access the file when requested by user 110.

Operation

With reference to FIG. 11, and with reference back to FIG. 2, access control logic 600 performs authentication and authorization for user 110 requesting access to IMS application server 200. User 110 must authenticate him/herself, for example, initially and also when making another request after a period of inactivity.

The process starts when user 110 requests data or inputs data for processing in an IMS 100 as shown in step 601. Access control logic 600 in IMS application server 200 determines if user 110 has previously been authenticated as shown in step 602. If the answer is no, the user 110 is prompted to authenticate him/herself as shown in step 603 and the authentication information is validated in step 604. After successfully authenticating him/herself, user session and application level settings are established for user 110 in step 605. Next, the page or screen being accessed is processed to determine if special authorization is required to view it as shown in step 606. If user 110 is authorized in step 607, the process continues to the business process logic 700 steps in FIG. 12. If a user is not authenticated or authorized during this process, one or more error messages may be displayed in step 610.

With reference to FIGS. 12 and 13, and with ongoing reference to FIG. 11, in one embodiment of the access control logic 600, several data elements about a user 110 are additionally retrieved from IMS database server 300 and are stored as session variables and application level settings in RAM 210 of IMS application server 200 for use in access control logic 600, business process logic 700 and presentation logic 800, collectively, creating a personalized display of data for each user 110. For example, record 1015 in FIG. 6 contains user access code in field 1025 and accounts allowed data in field 1040 for that user 110. For example, when Burt Hoovis accesses a list of accounts available for display, he will be authenticated and only accounts 8765432 and 6543210 listed in accounts allowed field 1040 will be displayed.

As shown in FIG. 12, business process logic 700 performs calculations and manages data operations for IMS application server 200. Several embodiments of this process, particularly step 705, are detailed below.

The process in FIG. 12 starts after the access control logic 600 steps are completed in FIG. 11. In step 701, the business process logic 700 determines if data are being input or queried. If data are being input, in step 702 it is determined if the data should be written to IMS database server 300. If the answer is yes, an update query is performed in step 704. Next, calculations are performed in step 705 using data written to or queried from database server 300, based on accompanying instructions from user 110 and corresponding business logic stored on IMS application server 200. The process continues in step 706 to determine whether the output should be presented back to the user 110. If the answer is yes, the results are passed to presentation logic 800 shown in FIG. 13. If the results are not to be displayed, the results are written to the database in step 704 and the process concludes.

In an alternate embodiment of business process logic 700, IMS application server 200 can perform one or more processes on a periodic basis, using the clock 225 to start those processes. The results of those processes can be stored on IMS database server 300 or sent over networks previously described to one or more electronic mail servers for communication to multiple users 110.

In one embodiment of step 705, described as a single account inquiry, holdings for the account specified in the instruction are accessed from the shares/units/par value field 1245 in portfolio database 1200, in conjunction with the CUSIP number in field 1235, the market value in field 1250, the tax cost in field 1255, the what-if trades in field 1260, and the base currency in field 1265. In addition, the full account title in field 1145 is accessed from the account database 1100 and the ticker symbol in field 1330, the security name in field 1335, the security type in field 1340, the stock sector in field 1350, the stock beta in field 1355, the market capitalization in field 1360, the yield % in field 1365, the price/earnings ratio in field 1370, the bond type in field 1375, the bond duration in field 1380, and the country of issue in field 1385 are accessed from company/security database 1300. Finally, information to link holdings with reports and documents for those holdings are accessed from publications database 1400, including the ticker in field 1450. The holdings and corresponding information may be listed in a text-based row-column format with one security displayed in each row and the corresponding data for each security displayed in columns with summary calculations at the bottom of the display.

The holdings may also be grouped by combinations of the country of issue in field 1385, the security type in field 1340, the stock sector in field 1350, the bond type in field 1375, for example, and are displayed as text-based summaries, graphics, such as pie charts or bar charts, or in one or more reports. These structured displays typically link to other displays through linking information embedded in the data returned in the display. The data in other fields, such as the stock beta in field 1355, the market capitalization in field 1360, the price/earnings ratio in field 1370, for example, are combined in a weighted-average or other calculation in structured displays and summaries.

A weighted average calculation is defined as each field value multiplied by the corresponding market value in field 1250 for each holding then adding those results and dividing that total by the summation of the market value in field 1250 for each holding involved in the calculation.

In another embodiment of step 705, described as a consolidated account inquiry, holdings for multiple accounts are retrieved simultaneously. These multiple account holdings are accessed in a similar manner to holdings and related fields described in the previous single account inquiry embodiment and calculations are performed to total the shares/units/par value in field 1245, the market value in field 1250, the tax cost in field 1255, and the what-if trades in field 1260 by each individual holding as identified by the unique CUSIP number in field 1235.

In another embodiment of step 705, described as an inquiry by asset, holdings for the same security across multiple accounts are retrieved simultaneously. These multiple holdings are accessed in a similar manner to the holdings and related fields described in the previous single account inquiry embodiment. Calculations are performed to total the shares/units/par value in field 1245, the market value in field 1250, the tax cost in field 1255, and the what-if trades in field 1260 by each individual holding as identified by the unique account number in field 1135.

In another embodiment of step 705, described as an investment policy setup, data are input by user 110 to record investment policy data for individual accounts. The target allocation in field 1160 records the target allocation percentages among stocks, bonds and cash investments designated for that account. Further, another account can be specified as a target or model account as shown in record 1115.

In another embodiment of step 705, described as what-if trading, one or more trades can be entered or calculated for a single account or multiple accounts without releasing the trades for execution. These trades are recorded in the what-if trades in field 1260 in the holdings database in field 1200. The trades can be combined with the shares/units/par value in field 1245 for each holding in a portfolio to create a what-if portfolio display as if the trades had been affected, including all calculations and displays. When the what-if trades are released and transmitted to trading and portfolio accounting system 400, they are deleted.

In another embodiment of step 705, described as portfolio monitoring, the holdings for one or more accounts are retrieved, aggregated and compared to predefined criteria. The results of these comparisons can be transmitted to each user 110 via electronic mail messages or, alternatively, they can be stored for later retrieval. Examples of these notifications include investment allocations that differ significantly from target allocations, overdrawn cash balances, insufficient collateralization for margin loans, and missing data.

In another embodiment of step 705, described as portfolio rebalancing, the holdings for one or more accounts are retrieved, aggregated and compared to the target allocation in field 1160 previously described. Where the resulting differences fall outside of predefined tolerance limits, one or more what-if trades may be created and stored in the what-if trades in field 1260 to bring the aggregation of shares/units/par value in field 1245 combined with the what-if trades in field 1260 within the prescribed tolerance limits. In an alternate embodiment, the rebalancing process may be scheduled and the clock 225 on IMS application server 200 can be used to run the rebalancing process periodically and the resulting what-if trades can be stored in field 1260 on IMS database server 300 and/or released to trading and portfolio accounting system 400 for execution.

In another embodiment of step 705, described as portfolio optimization, the holdings for one or more accounts are retrieved and are processed by one or more portfolio optimization calculation routines. Examples of additional parameters included in the optimization routine include risk statistics, cross-correlation of price behavior between securities, tax rates, and transaction costs. The results of these calculations can be returned to the user 110 for display or alternatively stored on IMS application server 200.

In another embodiment of step 705, described as performance tracking, holdings for each account are aggregated each business day and the market value in field 1250 are totaled and stored as a net asset value (NAV). Another calculation is performed to calculate the accrued income for each holding and the results are aggregated and stored as total accrued income. The NAV and accrued income are totaled from the previous day and divided into the same total from the current day to calculate a unit value return (UVR) and also stored for the current business day. In an alternate embodiment, the NAV is calculated for categories of holdings within each account and non-investment transactions are totaled each day and subtracted from the NAV for that day.

In another embodiment of step 705, described as base currency translation, holdings for a selected account are retrieved and the reporting currency in field 1170 in account database 1100 is compared to the base currency in field 1265 in the account database 1200, and holdings where the base currency is not equal to the reporting currency are converted to the reporting currency by multiplying the shares/units/par value in field 1245 by the last price in field 1345 and by multiplying that total by the appropriate cross-currency exchange rate.

In another embodiment of step 705, described as block trading, holdings for one or more selected assets are retrieved similar to an embodiment previously described as inquiry by asset. The holdings are then compared to parameters input by user 110 to calculate one or more trades per account that are aggregated by CUSIP into block trades. The trades are released to trading and portfolio accounting system 400 or stored in holdings database 1200 for later retrieval.

In another embodiment of step 705, described as document publishing, document information is recorded in publications database 1400 and the related electronic document is stored on IMS application server 200. The publication section in field 1435, the title in field 1440, the keywords in field 1445, the ticker in field 1450, the as-of-date in field 1455, the publication cycle in field 1460, the inquiry access in field 1465, the language in field 1470, and the file location in field 1475 are received as input and are written to IMS database server 300. Additionally, the electronic document is transmitted to IMS application server 200 over networks previously described and stored in the location specified in the file location stored in field 1475 for later retrieval. An alternate embodiment creates electronic mail messages to notify users 110 when new documents are published, using the e-mail address in field 1045 in user/customer database 1000 shown in FIG. 6.

In another embodiment of step 705, described as document search, document information previously described is returned based on search criteria input by user 110. The search is applied against one or more fields in publications database 1400, including the title in field 1440 and the keywords in field 1445, and records matching the search criteria are returned to user 110. In an alternate embodiment, documents may be retrieved from publications database 1400 by using the ticker in field 1450. For example, a display of holdings in a portfolio may also enclose links for stocks whereby the documents in publications database 1400 may be retrieved where the ticker matches the ticker in the holdings display.

In another embodiment of step 705, described as relationship tracking, records in the user/customer database 1000 shown in FIG. 6 may link to track family or business relationships between users. For example, when record 1005 is selected from user/customer database 1000, the user ID number in field 1020 is retrieved and used to search the database for records where that user ID number is recorded in the related-to-other customer in field 1070. In this case, record 1015 would be returned and the relationship to the other customer in field 1075 would describe the relationship of Burt Hoovis to John Smith as advisor. In alternate embodiments, additional information may be recorded, including the date and type of the last contact with the user and/or group of users identified as a relationship.

With reference to FIG. 13, and with ongoing reference to FIGS. 11-12, presentation logic 800 formats the results from business process logic 700 and returns the resulting display to the user 110 who initiated the request. Several embodiments of this process are detailed below.

Presentation logic 800 starts after step 706 of business process logic 700 is complete. In step 801, a decision is made to format the output as graphics or reports. If the answer is no, the data are formatted for text display or audio output in step 805 and returned to the user 110 in step 807. If the answer is yes, another decision is made in step 802 to determine if the output should be formatted as one or more reports. If the answer is no, the output will be returned as a graphics-based display as shown in step 804. If the answer is yes, the reports are created in step 803. Another decision is made in step 806 to determine whether the reports will be returned for the user for display or stored for access at another time at step 808. If not, the text, audio, graphic or reports are returned to user 110 at step 807 and the process terminates.

In one embodiment of step 805, described as hypertext markup language (HTML) formatting, the data received by business process logic 700 are formatted by enclosing the data elements in text strings that are defined as hyperlinks, allowing the user 110 to access data linked to a data element in the original display.

In another embodiment of step 805, described as extensible markup language (XML) formatting, the data received by business process logic 700 is formatted by enclosing the data elements in text strings that identify the type of data element. Additionally, another file containing text data type definitions is also created and transmitted in conjunction with the formatted data file for viewing or interpretation by software on the receiving side.

In another embodiment of step 805, described as wireless access protocol (WAP) formatting, the data received by business process logic 700 are formatted by enclosing the data elements in text strings that allow the data to be viewed on small format screens, such as wireless telephones.

In one embodiment of step 804, described as screen-based graphics creation, the data received by business logic 700 are processed by one or more programs to create charts and other graphics that visually display summaries of the data. In an alternate embodiment, screen-based graphics may be combined with HTML to create a combined display.

In one embodiment of step 803, described as single report creation, the data received by business logic 700 are processed by one or more programs to create single and multiple page reports. The reports can include text, graphics and other elements in a continuous report that is returned to the user 110 or stored on the IMS application server 200 for later retrieval. Alternate embodiments include formatting the report output as HTML, dynamic HTML (DHTML), and portable document format (PDF).

In another embodiment of step 803, described as multiple report creation, the data received by business logic 700 are processed by one or more programs to create single and multiple page reports for several accounts in succession and may be stored as one file or multiple files for later retrieval as described previously.

In another embodiment of step 803, described as table of contents creation, the output of the single or multiple reports creation processes previously described are processed by one or more programs to create a table of contents listing the types of reports attached and their starting page numbers.

Figure 14:
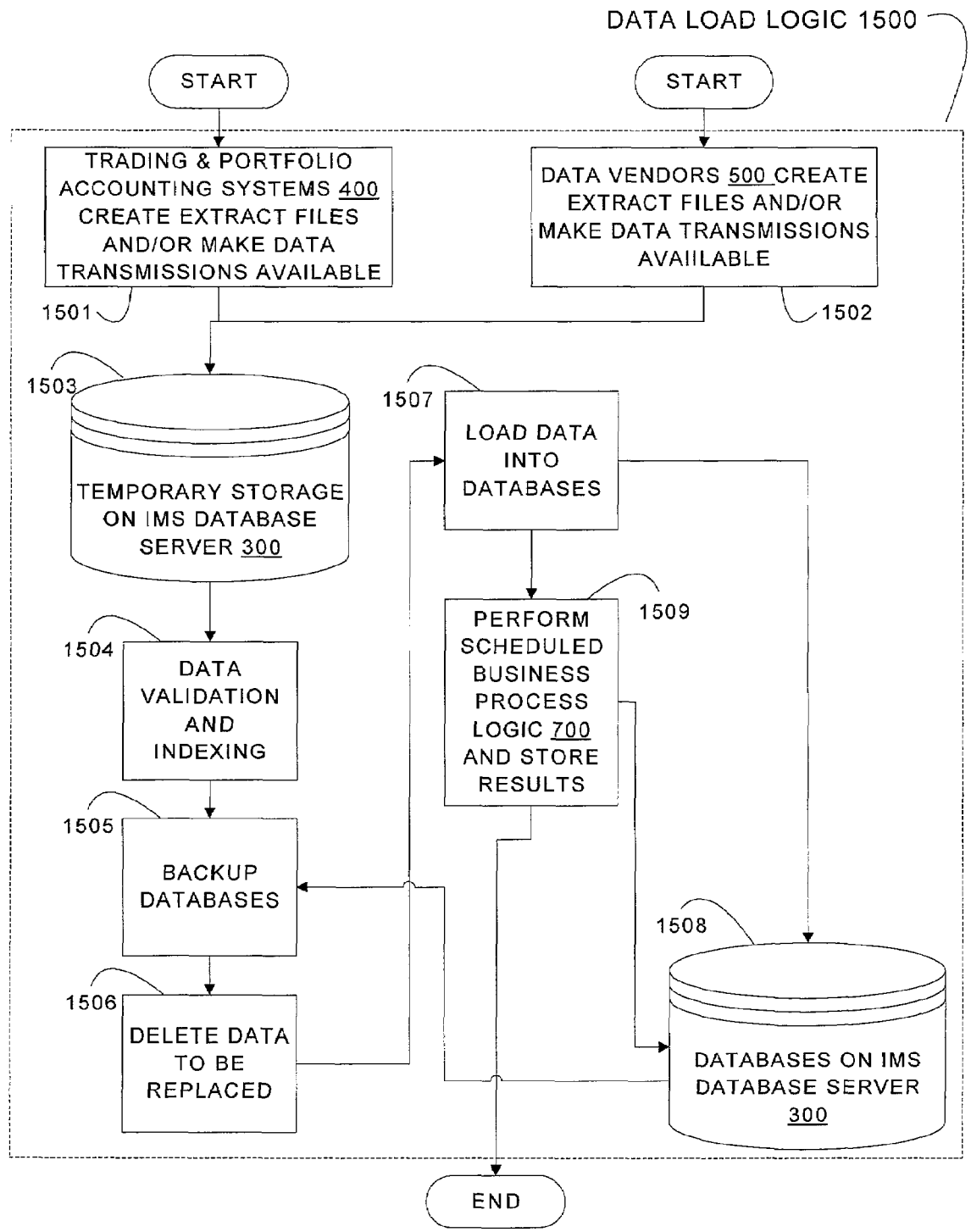
FIG. 14 is a flow chart diagram illustrating an embodiment of the data load logic from the IMS database server in FIG. 3.

With reference to FIG. 14, and with reference back to FIG. 3, data load logic 1500 receives data from trading and portfolio system 400 and data vendor 500 and stores it on IMS database server 300. In step 1501, trading and portfolio system 400 creates extract files for those accounts that have been preauthorized for transmission to IMS 100. Likewise, in step 1502, data vendor 500 creates extract files for the types of data and securities that have been preauthorized for transmission to IMS 100.

In step 1503, the extract files from all sources are received and stored in temporary databases on IMS database server 300 so the data can be validated in step 1504 to make sure that each transmission was complete and has the correct as-of-date and also indexed to make sure, for example, that there is a record in the company/security database 1300 to match every unique security in holdings database 1200. The existing databases are backed up in step 1505 before being deleted in step 1506.

The new data is loaded into the databases on IMS database server 300 in step 1507 and one or more scheduled processes are run as described previously and the results are stored on IMS database server 300. In an alternative embodiment of step 1508, electronic mail messages may be generated and transmitted to e-mail servers for delivery to one or more users. In step 1509, scheduled processes and calculations may be performed whereby the results of those calculations may be stored in step 1508.

In an alternate embodiment of data load logic 1500, data may be transmitted directly from trading and portfolio system 400 or data vendor 500 for display without being stored in an IMS database server 300. For example, data that are continuous, such as real-time pricing data or infrequently accessed, such as tax lots or transactions, may be accessed without being stored first.

The invention has been described with reference to various embodiments. Obvious modifications and alterations will occur to those of ordinary skill in the art upon reading and understanding the preceding detailed description. It is intended that the invention be construed as including all such modifications and alterations insofar as they come within the scope of the appended claims or the equivalents thereof.

We claim:

1. An investment management computer system in electronic communication with at least one of a data vendor or an electronic accounting system, the investment management computer system comprising:
   an electronic application server, the application server having logic configured to perform at least the following electronically:
      portfolio analysis of an investment portfolio, wherein the portfolio analysis includes aggregating a plurality of securities in the investment portfolio by security type;
      portfolio monitoring of the investment portfolio;
      reporting at least one holding of the investment portfolio;
   an electronic database server in communication with the application server, the database server having at least one associated electronic database; and,
   wherein the application server further includes data load logic configured to perform the following electronically on a periodic basis in association with at least one of the databases associated with the database server:
      extracting and receiving data into the database server database from at least one of the accounting system or a data vendor data source,
      validating the extracted and received data to promote a complete transmission and to promote a correct as-of-date transmission for the extracted and received data,
      deleting previously extracted and received data stored in the database server database, and
      replacing the deleted extracted and received data in the database server database with the newly extracted and received data.

2. The system of claim 1, further comprising a web browser in communication with the application server.

3. The system of claim 1, wherein the user is one of an investment professional and a customer of an investment professional.

4. The system of claim 1, wherein the database server includes an account database, a portfolio database, and a company/security database.

5. The system of claim 4, wherein the database server further includes a user database.

6. The system of claim 4, wherein the database server further includes a publication database.

7. The system of claim 1, wherein the application server has logic that is configured to additionally perform at least one of the following upon a request by the user:
   optimization of a plurality of holdings of the investment portfolio;
   record an investment policy for at least one customer account;
   track the performance of at least one holding of the investment portfolio;
   perform base currency translations;
   enable block trades of a plurality of holdings in the investment portfolio; or
   track relationships among multiple customers.

8. The system of claim 1, wherein the application server has logic that is configured to perform at least one operation on a scheduled basis upon a request by the user.

9. The system of claim 1, further comprising the application server being configured to perform scenario analysis, wherein the scenario analysis includes an analysis of possible trades of at least one security.

10. The system of claim 1, further comprising the application server being configured for linking at least one publication to at least one holding of the investment portfolio.

11. The system of claim 1, further comprising the application server being configured for trade calculation and rebalancing.

12. The system of claim 1, wherein the application server has logic that is configured to additionally perform the following upon a request by the user:
   optimization of a plurality of holdings of the investment portfolio;
   record an investment policy for at least one customer account;
   track the performance of at least one holding of the investment portfolio; and,
   enable block trades of a plurality of holdings in the investment portfolio.

13. A method of managing a portfolio of asset holdings, comprising:
   receiving a request from a user to perform an operation on the portfolio;
   electronically performing the following operations on the portfolio with an electronic application server:
      analyzing the portfolio, wherein analyzing the portfolio includes aggregating a plurality of securities in the portfolio by security type; and
      monitoring the portfolio;
   wherein the operation is performed using data from at least one of an accounting system and a data vendor;
   performing the following electronically with the application server on a periodic basis in association with an electronic database server:
      extracting and receiving data into a database associated with the database server from at least one of an accounting system or a data vendor data source,
      validating the extracted and received data to promote a complete transmission and to promote a correct as-of-date transmission for the extracted and received data,
      deleting previously extracted and received data stored in the database server database, and
      replacing the deleted extracted and received data in the database server database with the newly extracted and received data; and
   outputting a report to the user.

14. The method of claim 13, further comprising authenticating the user.

15. The method of claim 13, further comprising updating data in a database.

16. The method of claim 13, wherein receiving a request from a user to perform an operation on the portfolio includes receiving a request from a user to perform an operation on the portfolio on a scheduled basis.

17. The method of claim 13, wherein the operations further include responding to an account inquiry.

18. The method of claim 13, wherein the operations further include responding to an asset inquiry.

19. The method of claim 13, wherein the operations further include recording an investment policy.

20. The method of claim 13, wherein the operations further include comparing at least one holding of the portfolio to a predefined criterion.

21. The method of claim 13, wherein the operations further include comparing at least one holding of the portfolio to a target allocation.

22. The method of claim 13, wherein the operations further include performing an optimization calculation on at least one holding of the portfolio.

23. The method of claim 13, wherein the operations further include publishing a document and searching a document.

24. The method of claim 13, wherein the operations further include performing relationship tracking for a plurality of customers of an investment professional.

25. The method of claim 13, wherein the operations additionally include tracking a performance of at least one holding of the portfolio.

26. The method of claim 13, wherein the operations further include performing a currency translation.

27. The method of claim 13, wherein the operations further include trading a block of holdings of the portfolio.

28. The system of claim 13, further comprising performing the following operation on the portfolio: analyzing trading scenarios related to the portfolio, wherein analyzing includes analyzing possible trades of at least one asset.

29. The system of claim 13, further comprising performing the following operation on the portfolio: linking publications and data to the portfolio.

30. The system of claim 13, further comprising performing the following operations on the portfolio: calculating the effects of trades on the portfolio and rebalancing the portfolio.

31. A computer-readable medium having stored thereon instructions which, when executed by a processor, cause the processor to:

receive a request from a user to perform an operation on a portfolio of asset holdings;
electronically perform the following operations on the portfolio:
    analyzing the portfolio, wherein analyzing the portfolio includes aggregating a plurality of securities in the portfolio by security type; and
    monitoring the portfolio;
perform the following electronically with an electronic application server on a periodic basis in association with an electronic database server:
    extracting and receiving data into a database associated with the database server from at least one of an accounting system or a data vendor data source,
    validating the extracted and received data to promote a complete transmission and to promote a correct as-of-date transmission for the extracted and received data,
    deleting previously extracted and received data stored in the database server database, and
    replacing the deleted extracted and received data in the database server database with the newly extracted and received data; and,
output a report to the user.

32. The computer-readable medium of claim 31, having stored thereon additional instructions which, when executed by the processor, cause the processor to authenticate the user.

33. The computer-readable medium of claim 31, having stored thereon additional instructions which, when executed by the processor, cause the processor to perform the following operation on the portfolio: analyzing trading scenarios related to the portfolio, wherein analyzing includes analyzing possible trades of at least one asset.

34. The computer-readable medium of claim 31, having stored thereon additional instructions which, when executed by the processor, cause the processor to perform the following operation on the portfolio: linking publications and data to the portfolio.

* * * * *

UNITED STATES PATENT AND TRADEMARK OFFICE
CERTIFICATE OF CORRECTION

PATENT NO. : 7,587,350 B1
APPLICATION NO. : 09/915993
DATED : September 8, 2009
INVENTOR(S) : Stewart et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1437 days.

Signed and Sealed this

Twenty-first Day of September, 2010

David J. Kappos
*Director of the United States Patent and Trademark Office*